(12) United States Patent
Schmidt

(10) Patent No.: US 9,028,969 B2
(45) Date of Patent: May 12, 2015

(54) COMPOSITE ARTICLE HAVING PROTECTIVE COATING

(75) Inventor: Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 429 days.

(21) Appl. No.: 12/844,323

(22) Filed: Jul. 27, 2010

(65) Prior Publication Data
US 2012/0028055 A1  Feb. 2, 2012

(51) Int. Cl.
| | |
|---|---|
| C09D 175/04 | (2006.01) |
| C09D 107/00 | (2006.01) |
| C09D 123/16 | (2006.01) |
| C09D 123/28 | (2006.01) |
| C09D 123/34 | (2006.01) |
| C09D 175/02 | (2006.01) |
| C09D 183/04 | (2006.01) |
| C08K 3/04 | (2006.01) |
| C08K 3/08 | (2006.01) |
| C08K 3/22 | (2006.01) |
| C08K 5/5419 | (2006.01) |
| C08K 5/5425 | (2006.01) |
| C08K 7/22 | (2006.01) |

(52) U.S. Cl.
CPC .............. *C09D 175/04* (2013.01); *C08K 3/04* (2013.01); *C08K 3/08* (2013.01); *C08K 3/22* (2013.01); *C08K 5/5419* (2013.01); *C08K 5/5425* (2013.01); *C08K 7/22* (2013.01); *C09D 107/00* (2013.01); *C09D 123/16* (2013.01); *C09D 123/286* (2013.01); *C09D 123/34* (2013.01); *C09D 175/02* (2013.01); *C09D 183/04* (2013.01)

(58) Field of Classification Search
None
See application file for complete search history.

(56) References Cited

U.S. PATENT DOCUMENTS

| | | | |
|---|---|---|---|
| 4,370,160 A | 1/1983 | Ziemelis | |
| 5,484,867 A | 1/1996 | Lichtenhan et al. | |
| 5,674,610 A * | 10/1997 | Schaeffer et al. | 428/344 |
| 5,842,686 A * | 12/1998 | Hansen et al. | 267/140 |
| 5,994,014 A * | 11/1999 | Hinch et al. | 430/59.6 |
| 6,341,747 B1 * | 1/2002 | Schmidt et al. | 244/123.1 |
| 6,716,919 B2 | 4/2004 | Lichtenhan et al. | |
| 7,060,140 B2 | 6/2006 | Cheng et al. | |
| 7,265,178 B2 | 9/2007 | Maier et al. | |
| 2004/0167283 A1 | 8/2004 | Vinciguerra et al. | |

(Continued)

FOREIGN PATENT DOCUMENTS

| | | |
|---|---|---|
| DE | 10249453 | 6/2003 |
| EP | 1972774 | 9/2008 |

(Continued)

OTHER PUBLICATIONS

Hawley's Condensed Chemical Dictionary 14th Edition definition of "vinyl compound" (2002).*

(Continued)

*Primary Examiner* — Kenneth Stachel
(74) *Attorney, Agent, or Firm* — Carlson, Gaskey & Olds, P.C.

(57) ABSTRACT

A composite article includes a substrate and a protective coating on at least a portion of the substrate. The protective coating includes reinforcement particles dispersed within an elastomeric matrix that is modified with a silicon-containing modifier selected from polysilsesquioxane, polyhedral oligomeric silicate and polyhedral oligomeric silsesquioxane (POSS).

23 Claims, 2 Drawing Sheets

(56) References Cited

U.S. PATENT DOCUMENTS

| | | | |
|---|---|---|---|
| 2006/0110612 A1* | 5/2006 | Simendinger et al. | 428/447 |
| 2006/0167206 A1 | 7/2006 | Maier et al. | |
| 2006/0188732 A1* | 8/2006 | Lichtenhan et al. | 428/447 |
| 2006/0263531 A1* | 11/2006 | Lichtenhan et al. | 427/377 |
| 2009/0018273 A1* | 1/2009 | Keller et al. | 525/337 |
| 2009/0084512 A1 | 4/2009 | Moffett | |
| 2010/0126981 A1* | 5/2010 | Heintz et al. | 219/482 |
| 2010/0324187 A1* | 12/2010 | Clarke | 524/405 |
| 2011/0223436 A1* | 9/2011 | Wu et al. | 428/474.4 |

FOREIGN PATENT DOCUMENTS

| | | |
|---|---|---|
| JP | 1172473 | 7/1989 |
| JP | 06039962 A * | 2/1994 |
| JP | 2004323716 | 11/2004 |
| WO | 2007052260 | 5/2007 |

OTHER PUBLICATIONS

JP Patent 06039962 English machine translation (1994).*
Liu, Thermal Stability of POSS/Methylsilicone Nanocomposites, Composites Science and Technology, 67 (2007) 2864-2876.
Dr. Chris Dearmitt Frsc, Chief Scientist, "Poss Flow Aids & Dispersants", Hybrid Plastics Inc., Hattiesburg, MS, USA, http:/www.hybridplastics.com/docs/dispers.pdf.
Partial European Search Reported dated Oct. 26, 2011.
Dr. Chris Dearmitt Frsc, Chief Scientist, "Poss Flow Aids & Dispersants", Hybrid Plastics Inc., Hattiesburg, MS, USA, http:/www.hybridplastics.com/docs/dispers.pdf, (2009).

* cited by examiner

COMPOSITE ARTICLE HAVING PROTECTIVE COATING

BACKGROUND

Structures, such as airfoils, propellers, fan blades, helicopter rotor blades, gas turbine engine blades and vanes, engine inlets, and airframe leading edges are subjected to various environmental conditions during use. For instance, the air moving over the structure may include particulate matter, such as sand, or water droplets, such as rain, which impact the structure and cause erosion. Likewise, water or other fluid may wet the surface of the structure and then freeze to form ice. Typically, the structure may include a sheath or coating that protects the structure from such environmental conditions.

SUMMARY

An example composite article includes a substrate and a protective coating on at least a portion of the substrate. The protective coating includes reinforcement particles dispersed within an elastomeric matrix that is modified with a silicon-containing modifier selected from the group consisting of polysilsesquioxane, polyhedral oligomeric silicate and polyhedral oligomeric silsesquioxane.

In another aspect, the composite article includes an airfoil having a body that extends between a leading edge and a trailing edge, and the protective coating on at least a portion of the leading edge. The protective coating includes silicone microsphere reinforcement particles dispersed within a silicone elastomer matrix that is modified with polyhedral oligomeric silsesquioxane (POSS) selected from a group consisting of trisnorbornenylisobutyl-POSS, trisilanolisooctyl-POSS, trisilanolphenyl-POSS, trisilanolisobutyl-POSS, trisilanolcyclopentyl-POSS, trisilanolcyclohexyl-POSS, vinyl-containing-POSS and combinations thereof.

An example method of fabricating the composite article includes mixing polyhedral oligomeric silsesquioxane with reinforcement particles to form a dispersion of the reinforcement particles. The dispersion is then mixed with a resin compound and the mixed resin compound is then cured to form the protective coating on at least a portion of a substrate.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1A:
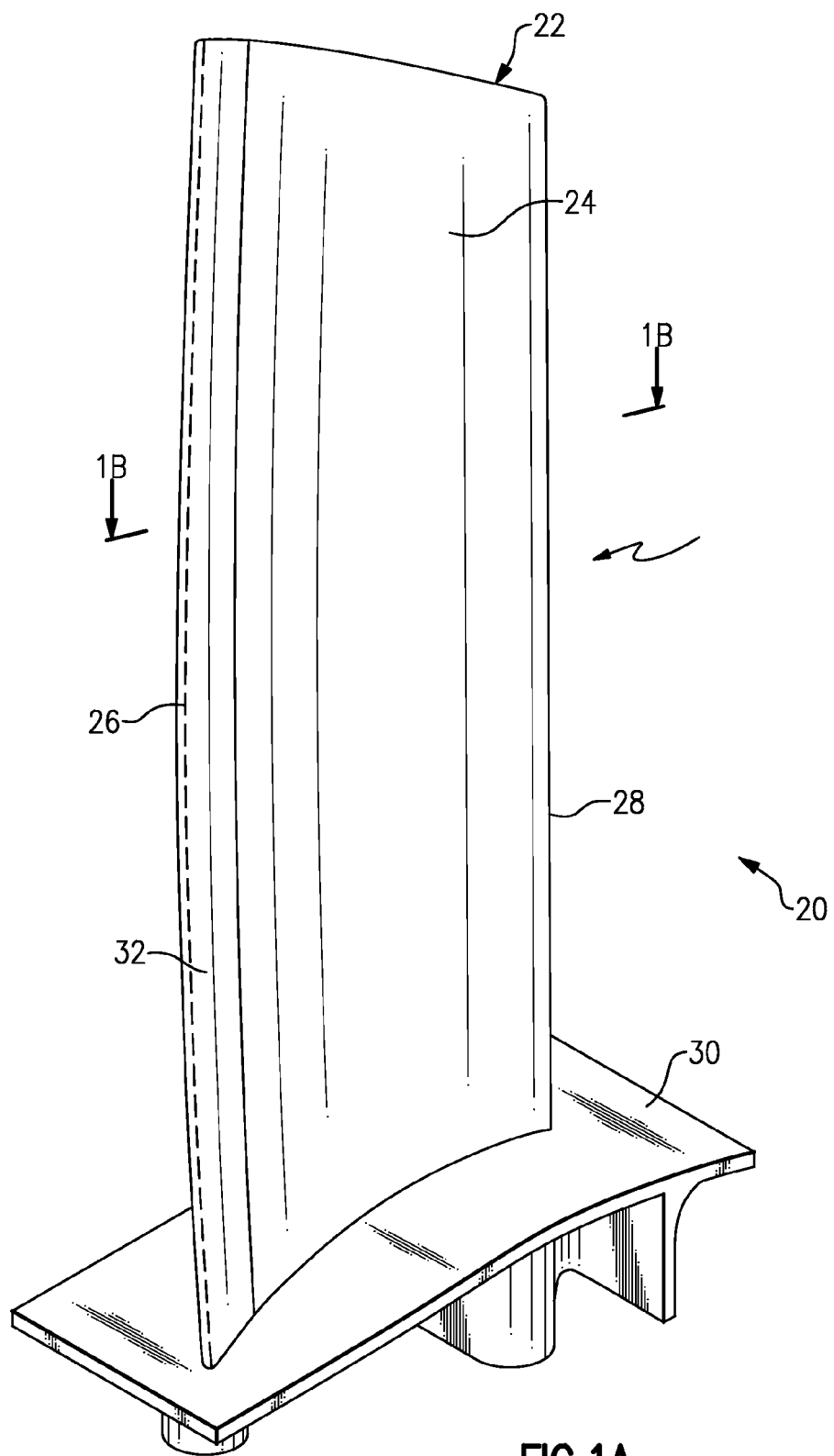
FIG. 1A illustrates an example composite article having a protective coating that includes reinforcement particles within an elastomeric matrix modified with a silicon-containing matrix modifier.

FIG. 1A illustrates selected portions of an example composite article 20. In this example, the composite article 20 is a blade having an airfoil 22 for use in a gas turbine engine. However, it is to be understood that the examples disclosed herein may also be applied to other components or substrates, and to other components on which ice may build up, such as engine inlets and other leading edges, e.g., of aircraft wings.

In the illustrated example, the airfoil 22 of the composite article 20 includes a body 24 that extends between a leading edge 26 and a trailing edge 28 relative to fluid flow over the airfoil 22. In general, the airfoil 22 has a wing-like shape that provides a lift force via Bernoulli's principle such that one side of the airfoil 22 is a suction side and the other side of the airfoil 22 is a pressure side. The airfoil 22 is connected to a root portion 30 for mounting the composite article 20 in an engine.

Figure 1B:
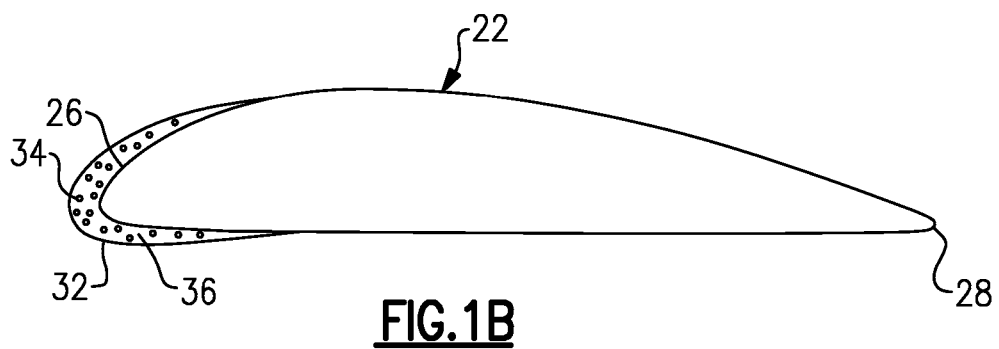
FIG. 1B illustrates a cross-section of the composite article shown in FIG. 1A.

The airfoil 22 of composite article 20 serves as substrate for a protective coating 32, which is on at least a portion of the surfaces of the airfoil 22. As illustrated in FIG. 1B, the protective coating 32 has an environmentally exposed outer surface and an opposed inner surface in direct contact with the airfoil 22, and the protective coating 32 wraps around the leading edge 26 of the airfoil 22 to protect the leading edge 26 from environmental conditions, such as erosion, ice formation, and the like. Alternatively, the protective coating 32 may be applied to other portions of the airfoil 22 or all the surfaces of the airfoil 22, depending upon the needs for environmental resistance.

The protective coating 32 is made of reinforcement particles 34 that are dispersed within an elastomeric matrix 36 that is modified with a silicon-containing modifier, such as polysilsesquioxane (PS), polyhedral oligomeric silicate (POS) or polyhedral oligomeric silsesquioxane (POSS).

In general, POS and POSS have a polyhedral morphology and PS, POS and POSS are compounds represented by the chemical formula $RSiO_{1.5}$, where Si is silicon, O is oxygen, and R is an organic substituent such as hydrogen, siloxy, alkyl, alkene, aryl, arylene, silene, methyl, ethyl, iso-butyl, iso-octyl, phenyl, cyclic or linear aliphatic or aromatic groups, acrylate, methacrylate, epoxy, vinyl, fluoro-alkyl, alcohol, ester, amine, ketone, olefin, ether, halide, thiol, carboxylic acid, norbornenyl, sulphonic acid, polyethylene glycol, polyethylene oxalate, or other desired organic group. In particular examples designed for aeronautic applications, the POSS is trisnorbornenylisobutyl-POSS, trisilanolisooctyl-POSS trisilanolphenyl-POSS trisilanolisobutyl-POSS, trisilanolcyclopentyl-POSS trisilanolcyclohexyl-POSS, vinyl-containing-POSS or combinations thereof.

Polysilsesquioxanes are materials represented by the formula $[RSiO_{1.5}]_\infty$ where $\infty$ is the molar degree of polymerization and R is an organic substituent as defined above. Polysilsesquioxanes may be either homoleptic or heteroleptic. Homoleptic systems contain only one type of R group while heteroleptic systems contain more than one type of R group. POS and POSS nanostructure compositions are represented by the formulae: $[(RSiO_{1.5})_n]_{\Sigma\#}$ for homoleptic compositions, $[(RSiO_{1.5})_m(R'SiO_{1.5})_n]_{\Sigma\#}$ for heteroleptic compositions (where R≠R'), and $[(RSiO_{1.5})_m(RXSiO_{1.0})_n]_{\Sigma\#}$ for functionalized heteroleptic compositions (where R groups can be equivalent or inequivalent)

In all of the above R is the same as defined above and X includes but is not limited to OH, Cl, Br, I, alkoxide (OR), acetate (OOCR), peroxide (OOR), amine ($NR_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n. It should be noted that $\Sigma\#$ is not to be confused as a multiplier for determining stoichiometry, as it merely describes the overall nanostructural characteristics of the system (aka cage size).

The elastomeric matrix 36 may be selected from polyurethane, fluoropolymer, polyurea, silicone, polysiloxane, natural rubber, polyolefin, chlorosulphonated polyethylene, chlorinated polyethylene, ethylene-propylene copolymer, other elastomeric materials, or combinations thereof. For aerospace applications, using silicone as the elastomeric matrix 36 is desirable for erosion resistance and anti-icing.

The reinforcement particles 34 may be selected from ceramic, metal, carbon, elastomeric particles, or combinations of different kinds of reinforcement particles 34. In a few examples of ceramic reinforcement particles 34, the particles may be alumina, silicon oxide, silicon carbide, silicon aluminum oxynitride, silicon nitride, silicon oxycarbide, silicon oxynitride, boron carbide or generally oxides, nitrides, carbides, or combinations thereof. The reinforcement particles 34 may also be selected from a variety of different morphologies, such as fibers, platelets, whiskers, spheres, or other desirable shapes. Surfaces of the reinforcement particles can be generally smooth or textured.

In a few examples of metals that may be used, the metal reinforcement particles 34 are nickel or other conductive metal for imparting the protective coating 32 with electrical conductivity. Alternatively, the metal particles may be silicon or a silicon-containing material such as an intermetallic compound.

Examples of carbon reinforcement particles that may be used as reinforcement particles 34 are single or multiwall carbon nanotubes, carbon black, nanofibers or graphene or combinations thereof.

In another example, the reinforcement particles 34 are an elastomer, such as silicone. In one particular example, the reinforcement particles 34 are silicone microspheres and the elastomeric matrix 36 is silicone elastomer such that the protective coating 32 consists essentially of the POSS, and the silicone microspheres dispersed throughout a matrix of silicone elastomer.

The amount of POSS and reinforcement particles 34 used within the elastomeric matrix 36 may be selected to tailor the properties of the protective coating 32 to achieve resistance to particular environmental conditions. In some examples, the protective coating 32 includes up to 20 wt % of the POSS and up to 75 wt % of the reinforcement particles. However, in many instances, a lower amount of the reinforcement particles 34 may be used. For example, an amount of 1-50 wt % of the reinforcement particles 34 may be desired for achieving erosion resistance or anti-icing for very dense reinforcement particles such as certain metals, and in another example, an amount of 1-15 wt % for certain ceramics, carbon and elastomeric reinforcement particles may be desired.

The composition of the protective coating 32 may also be tailored to the particular environmental conditions that the composite article 20 is expected to encounter in operation. For instance, the composition can be tailored to facilitate optimization of the protective capability of the protective coating 32 for a particular type of environmental condition, such as protection at different angles of incidence for incoming erosion material.

In the protective coating 32, the POSS functions as a nano-sized reinforcement to the elastomeric matrix 36. For instance, the POSS is on the order in size of about 0.5-1000 nanometers. In further examples, the POSS may range in size from about 1-500 nanometers, or even about 5-100 nanometers. The POSS modifies the elastomer material by increasing the toughness and/or stiffness (modulus). Additionally, the POSS serves as a dispersant relative to the reinforcement particles 34 to facilitate reduction in agglomeration of the reinforcement particles 34. That is, the POSS enables a more uniform dispersion of the reinforcement particles 34 within the elastomeric matrix 36 to enhance the reinforcing effect. The protective coating 32 is thereby better suited to protect the airfoil 22 from environmental conditions, such as erosion and icing.

The protective coating 32 may be provided in any suitable form for attachment to the airfoil 22, such as a coating that is deposited onto the airfoil 22 or as a tape or appliqué that is adhered to the airfoil 22. The thickness of the coating, tape or appliqué can be selected based on the desired level of protection and should be at least 2 times the thickness of the largest average dimension of the reinforcement particles. Desired thicknesses of the protective coating range from about 5 microns to about 250 microns. In one example, the protective coating 32 is formed by mixing the POSS with the reinforcement particles 34 to form a dispersion of the reinforcement particles 34. By mixing the POSS directly with the reinforcement particles 34, the POSS contacts the reinforcement particles 34 and reduces the amount of agglomerates or extent of agglomeration. The dispersion of reinforcement particles 34 is then mixed with a resin compound, which is a precursor to the elastomeric matrix 36. For instance, if the elastomeric matrix 36 is to be silicone, the resin compound may be a silicone resin. The mixing with the resin compound disperses the reinforcement particles 34 uniformly throughout the compound. The mixed compound is then cured in a known manner to form the protective coating 32. The mixed resin compound may be cured in situ on the airfoil 22 or cured separately from the airfoil 22 in the form of a tape or appliqué that is then applied to the airfoil 22. The use of appropriate solvents or liquid carriers may be used to assist processing of the POSS, the reinforcement particles, the resin compound or combinations of these. The solvents may be subsequently removed using combinations of heat, reduced pressure and volatility characteristics of the solvent. In one example, a mixture of POSS, silicone microspheres and silicone resin are combined in the presence of solvent to aid spray deposition of the protective coating onto an airfoil.

Figure 2:
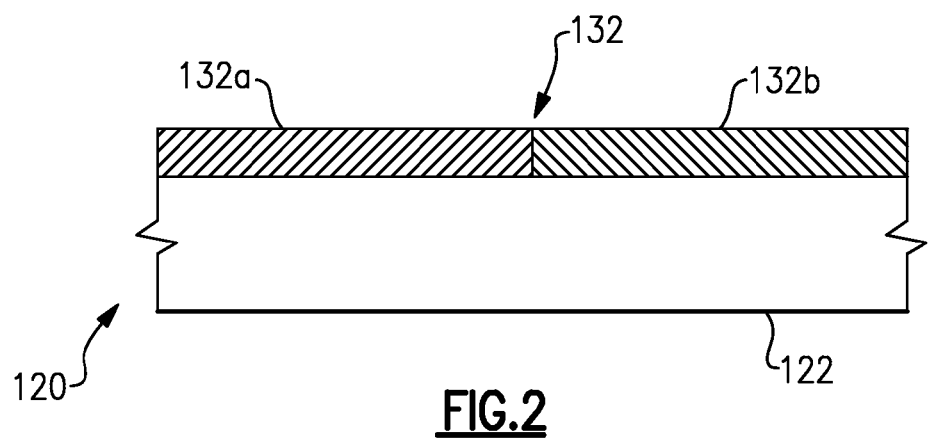
FIG. 2 illustrates another example composite article having a multi-layered protective coating.

FIG. 2 illustrates a portion of another example composite article 120 that may also be an airfoil as illustrated in FIG. 1A. In this case, the composite article 120 includes an airfoil portion 122 and a multi-layered protective coating 132 on the airfoil 122. The protective coating 132 includes a first layer 132*a* and a second layer 132*b* that is arranged adjacent to the first layer 132*a* such that both the first layer 132*a* and the second layer 132*b* have an environmentally exposed outer surface and an opposed inner surface in direct contact with the airfoil portion 122, which as discussed above serves as a substrate for the coating. That is, the second layer 132*b* runs contiguously to the first layer 132*a*.

The first layer 132*a* has a composition as described in the examples above for the protective coating 32. The second layer 132*b* also has a composition as described above, but is of a different composition than the first layer 132*a*. Thus, the multi-layered protective coating 132 provides resistance to a first type of environmental condition by way of the first layer 132*a* and resistance to a second type of environmental condition by way of the second layer 132*b*.

As an example, the composition of the first layer 132*a* may be designed to resist erosion at a first angle of incidence relative to the airfoil 122 and the second layer 132*b* may be designed to resist erosion relative to a different angle of incidence. Alternatively, one of the layers 132*a* or 132*b* may be designed for erosion resistance and the other layer 132*a* or 132*b* may be designed for anti-icing. In this regard, one of the layers 132*a* or 132*b* may include a first kind of reinforcement particle, such as the silicone microspheres, and the other layer 132a or 132b may include a different kind of reinforcement particle, such as a ceramic material, metal, carbon or alternative elastomeric material. The first and second layer may have the same or different thicknesses.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
a substrate; and
a protective coating on at least a portion of the substrate, the protective coating comprising reinforcement particles dispersed within an elastomeric matrix that is modified with a polyhedral oligomeric silsesquioxane (POSS) selected from the group consisting of trisnorbornenylisobutyl-POSS, trisilanolisooctyl-POSS, trisilanolphenyl-POSS, trisilanolisobutyl-POSS, trisilanolcyclopentyl-POSS, trisilanolcyclohexyl-POSS, vinyl-containing-POSS and combinations thereof, wherein the protective coating is multi-layered and includes a first layer having a first composition, and a second layer having a second, different composition and that is arranged adjacent to the first layer such that both the first layer and the second layer have an environmentally exposed outer surface and an opposed inner surface in direct contact with the substrate, and wherein the first composition is selected with respect to resisting erosion at a first angle of incidence and the second composition is selected with respect to resisting erosion at a second, different angle of incidence.

2. The composite article as recited in claim 1, wherein the elastomeric matrix is selected from the group consisting of polyurethane, fluoropolymer, polyurea, silicone, polysiloxane, natural rubber, polyolefin, chlorosulphonated polyethylene, chlorinated polyethylene, ethylene-propylene copolymer, and combinations thereof.

3. The composite article as recited in claim 1, wherein the elastomeric matrix is silicone or polysiloxane.

4. The composite article as recited in claim 1, wherein the reinforcement particles are metal.

5. The composite article as recited in claim 1, wherein the reinforcement particles are carbon reinforcement particles.

6. The composite article as recited in claim 1, wherein the reinforcement particles are ceramic.

7. The composite article as recited in claim 1, wherein the reinforcement particles are electrically conductive.

8. The composite article as recited in claim 1, wherein the reinforcement particles are silicone microspheres.

9. The composite article as recited in claim 1, wherein the protective coating includes up to 20 wt % of the POSS.

10. The composite article as recited in claim 1, wherein the protective coating includes up to 75 wt % of the reinforcement particles.

11. The composite article as recited in claim 1, wherein the protective coating includes 1-50 wt % of the reinforcement particles.

12. The composite article as recited in claim 1, wherein the first composition includes silicone microsphere reinforcement particles and the second, different composition includes metal, carbon, or ceramic reinforcement particles.

13. The composite article as recited in claim 1, wherein the POSS is the trisnorbornenylisobutyl-POSS.

14. The composite article as recited in claim 1, wherein the POSS is the trisilanolisooctyl-POSS.

15. The composite article as recited in claim 1, wherein the POSS is the trisilanolphenyl-POSS.

16. The composite article as recited in claim 1, wherein the POSS is the trisilanolisobutyl-POSS.

17. The composite article as recited in claim 1, wherein the POSS is the trisilanolcyclopentyl-POSS.

18. The composite article as recited in claim 1, wherein the POSS is the trisilanolcyclohexyl-POSS.

19. The composite article as recited in claim 1, wherein the POSS is the vinyl-containing-POSS.

20. A composite article comprising:
an airfoil having a body that extends between a leading edge and a trailing edge; and
a protective coating on at least a portion of the leading edge, the protective coating comprising silicone microsphere reinforcement particles dispersed within a silicone elastomer matrix that is modified with polyhedral oligomeric silsesquioxane (POSS) selected from the group consisting of trisnorbornenylisobutyl-POSS, trisilanolisooctyl-POSS, trisilanolphenyl-POSS, trisilanolisobutyl-POSS, trisilanolcyclopentyl-POSS, trisilanolcyclohexyl-POSS, vinyl-containing-POSS and combinations thereof, wherein the protective coating is multi-layered and includes a first layer having a first composition, and a second layer having a second, different composition and that is arranged adjacent to the first layer such that both the first layer and the second layer have an environmentally exposed outer surface and an opposed inner surface in direct contact with the body, wherein the first composition is selected with respect to resisting erosion at a first angle of incidence and the second composition is selected with respect to resisting erosion at a second, different angle of incidence.

21. The composite article as recited in claim 20, wherein the protective coating includes up to 20 wt % of the POSS.

22. The composite article as recited in claim 20, wherein the protective coating includes 1-15 wt % of the silicone microsphere reinforcement particles.

23. A composite article comprising
a substrate; and
a protective coating on at least a portion of the substrate, the protective coating comprising reinforcement particles dispersed within an elastomeric matrix that is modified with a polyhedral oligomeric silsesquioxane (POSS) selected from the group consisting of trisnorbornenylisobutyl-POSS, trisilanolisooctyl-POSS, trisilanolphenyl-POSS, trisilanolisobutyl-POSS, trisilanolcyclopentyl-POSS, trisilanolcyclohexyl-POSS, vinyl-containing-POSS and combinations thereof, wherein the protective coating is multi-layered and includes a first layer having a first composition, and a second layer having a second, different composition and that is arranged adjacent to the first layer such that both the first layer and the second layer have an environmentally exposed outer surface and an opposed inner surface in direct contact with the substrate, wherein the first composition is selected with respect to erosion resistance and the second composition is selected with respect to anti-icing.

* * * * *